United States Patent
le Mar

(10) Patent No.: US 10,552,399 B2
(45) Date of Patent: Feb. 4, 2020

(54) PREDICTING INDEX FRAGMENTATION CAUSED BY DATABASE STATEMENTS

(71) Applicant: QUEST SOFTWARE INC., Aliso Viejo, CA (US)

(72) Inventor: Guy le Mar, McKinnon (AU)

(73) Assignee: QUEST SOFTWARE INC., Aliso Viejo, CA (US)

( * ) Notice: Subject to any disclaimer, the term of this patent is extended or adjusted under 35 U.S.C. 154(b) by 479 days.

(21) Appl. No.: 15/171,408

(22) Filed: Jun. 2, 2016

(65) Prior Publication Data

US 2017/0351721 A1    Dec. 7, 2017

(51) Int. Cl.
*G06F 16/00* (2019.01)
*G06F 16/22* (2019.01)
*G06F 16/2453* (2019.01)

(52) U.S. Cl.
CPC .... *G06F 16/2272* (2019.01); *G06F 16/24542* (2019.01)

(58) Field of Classification Search
CPC ......... G06F 17/30336; G06F 17/30463; G06F 17/30339; G06F 16/2272; G06F 16/24542; G06F 16/22
USPC ................................................ 707/600–899
See application file for complete search history.

(56) References Cited

U.S. PATENT DOCUMENTS

| | | | |
|---|---|---|---|
| 8,489,565 B2* | 7/2013 | Balasubramanian | G06F 17/30336 707/696 |
| 2006/0085378 A1* | 4/2006 | Raizman | G06F 16/22 |
| 2006/0085484 A1* | 4/2006 | Raizman | G06F 16/2282 |
| 2006/0167928 A1* | 7/2006 | Chakraborty | G06F 17/2205 |
| 2009/0112795 A1* | 4/2009 | Abraham | G06F 16/2462 |
| 2011/0225164 A1* | 9/2011 | Narasayya | G06F 16/2282 707/741 |
| 2013/0054637 A1* | 2/2013 | Dutta | G06F 17/30306 707/769 |
| 2013/0311446 A1* | 11/2013 | Clifford | G06F 17/30469 707/719 |
| 2014/0279961 A1* | 9/2014 | Schreter | G06F 3/0608 707/693 |
| 2015/0039555 A1* | 2/2015 | Rao | G06F 17/30377 707/607 |

* cited by examiner

*Primary Examiner* — Michelle N Owyang
(74) *Attorney, Agent, or Firm* — Maschoff Brennan

(57) ABSTRACT

Systems and techniques for determining a total predicted index fragmentation associated with executing a structured query language statement are described. An execution plan associated with the structured query language statement may be determined. A plurality of tables estimated to be affected by execution of the structured query language statement may be determined. For individual tables, an estimated number of rows that the structured query language statement is to affect may be determined. A predictive model, such as a support vector machine, may be used to determine, for individual tables whose indexes are estimated to be affected, a predicted change in an average index fragmentation percentage associated with individual indexes on the affected tables. The sum of the predicted change in the average index fragmentation percentage of affected indexes may be determined to determine the total predicted index fragmentation associated with executing the structured query language statement.

20 Claims, 6 Drawing Sheets

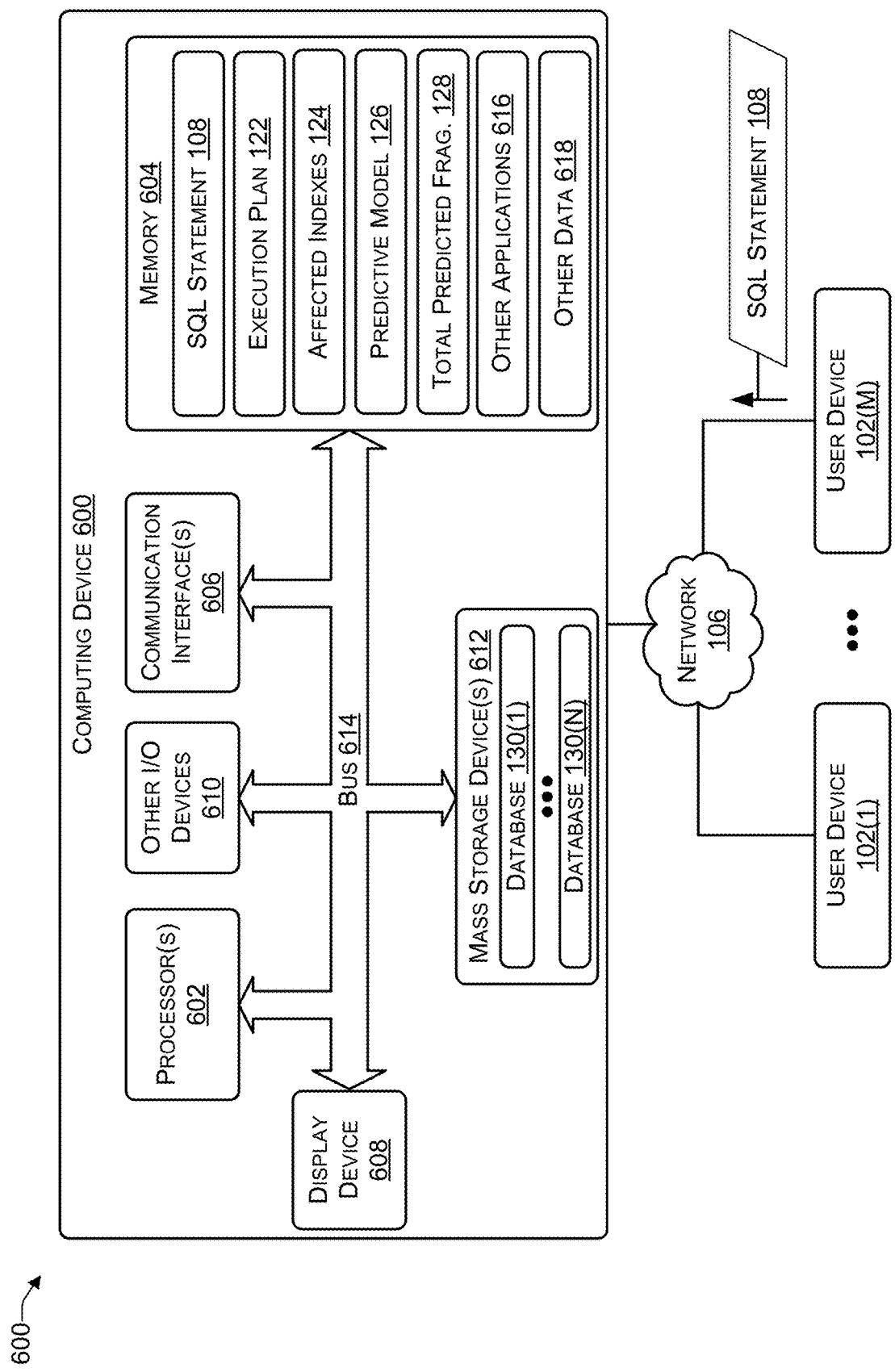

PREDICTING INDEX FRAGMENTATION CAUSED BY DATABASE STATEMENTS

BACKGROUND

As the value and use of information continues to increase, individuals and businesses seek additional ways to process and store information. One option available to users is information handling systems (e.g. databases). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Databases, such as relational database management systems (RDBMS), may use indexes of tables when executing database queries, such as queries in Structured Query Language (SQL). An index of a table is a lookup table that a database search engine can use to speed up data retrieval, similar to how an index of a book can speed up finding where a particular topic is discussed in the book. For example, the index may be a pointer to data in the table. As SQL operations (e.g., INSERT, UPDATE, DELETE, or the like) are performed to the table, over a period of time, the index may become fragmented. For example, the index fragmentation may cause the index to increase in physical size and become less densely populated. A fragmented index may cause the database to execute SQL queries less efficiently, as each physical I/O operation yields a reduced volume of information from the index file during each read/write operation. Thus, as index fragmentation increases, the efficiency with which SQL queries are executed may decrease.

The typical resolution to the problem of index fragmentation is for a database administrator (DBA) to periodically check on indexes to identify indexes that are significantly fragmented, and either (a) defragment them while the index is in-service (e.g., while the index remains available to the SQL execution engine), or (b) take the index offline (e.g., during an off-peak time) and rebuild the index. During the index rebuild, the SQL execution engine may revert to non-index-based operations in order to perform a query. For example, an inefficient operation, such as a full-table-scan, may be used during the period of time that an index is being rebuilt. Option (a) is preferential to option (b) because option (a) provides more efficient database access. Thus, a DBA may prefer to identify fragmentation early (i.e. before it gets too bad) to enable the DBA to select option (a). If the fragmentation is significant (e.g., greater than a predetermined threshold), then option (a) may be unavailable and the DBA may select option (b). However, having a DBA manually check the fragmentation of indexes manually to identify fragmented indexes may be time consuming and tedious.

SUMMARY

This Summary provides a simplified form of concepts that are further described below in the Detailed Description. This Summary is not intended to identify key or essential features and should therefore not be used for determining or limiting the scope of the claimed subject matter.

Systems and techniques for determining a total predicted index fragmentation associated with executing a structured query language statement are described. An execution plan associated with the structured query language statement may be determined. A plurality of tables estimated to be affected by execution of the structured query language statement may be determined. For individual tables, an estimated number of rows that the structured query language statement is to affect may be determined. A predictive regression model, such as a support vector machine, may be used to determine, for individual tables whose indexes are estimated to be affected, a predicted change in an average index fragmentation percentage associated with individual indexes on the affected tables. The sum of the predicted change in the average index fragmentation percentage of affected indexes may be determined to determine the total predicted index fragmentation associated with executing the structured query language statement.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 6 illustrates an example configuration of a computing device (e.g., a database server) that can be used to implement the systems and techniques described herein.

DETAILED DESCRIPTION

Figure 1:
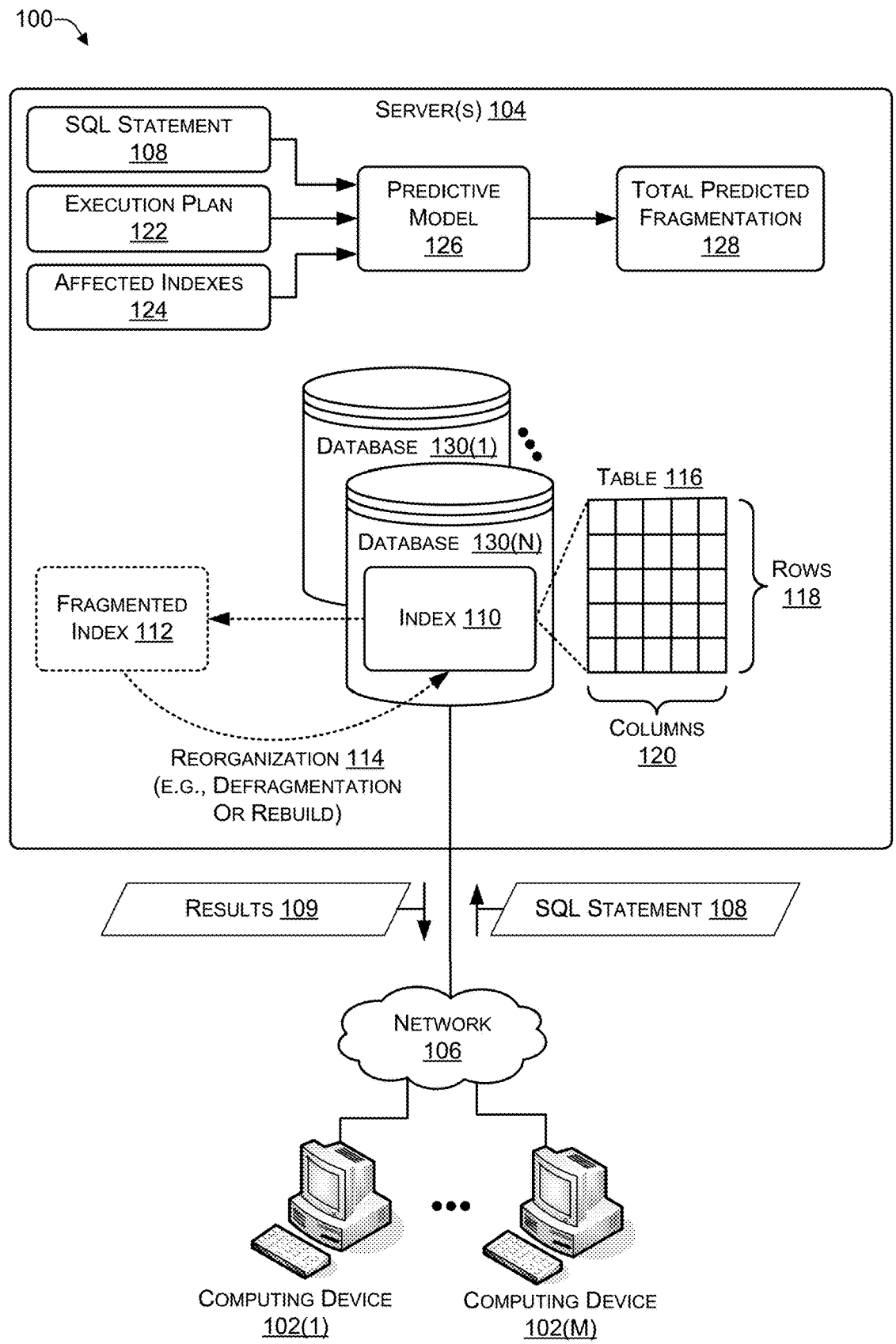
FIG. 1 is a block diagram illustrating a computing system that includes multiple databases according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The system and techniques described herein enable a user to predict (e.g., using a regression model) an amount of index fragmentation caused by a database statement, such as a structured query language (SQL) statement. While some of the examples described herein reference accessing a database using an SQL statement, similar techniques may be applied to other types of databases (e.g., other than SQL databases). For example, a developer may use the system and techniques to create an SQL statement that causes less index fragmentation as compared to other SQL statements that accomplish the same result. As another example, a database administrator (DBA) may use the systems and techniques to identify a particular database statement that causes a large amount (e.g., more than a threshold amount) of index fragmentation and schedule the particular database statement for execution at an appropriate time, e.g., prior to a previously scheduled index rebuild operation or defragmentation operation.

When the fragmentation of an index is greater than a threshold amount, the DBA may reorganize the index, e.g., either by defragmenting the index online (e.g., while the database is available for use), or by taking the index offline (e.g., unavailable for use) and rebuilding the index while the index is off-line. Performing a defragmentation is more desirable than performing a rebuild because during defragmentation the index remains online and available, thereby reducing the impact on database users. By reducing the amount of index fragmentation, the availability of an index may increase because (1) the indexes may be reorganized more often using a defragment rather than a rebuild operation and (2) the amount of time that the index has to be taken offline to rebuild the index may be reduced.

The systems and techniques described herein may enable developers and DBAs to determine the causes of index fragmentation by determining how much index fragmentation each SQL statement is predicted to cause. In this way, developers can create SQL statements to reduce preventable fragmentation, and DBAs can mitigate unavoidable fragmentation by scheduling SQL statements predicted to cause index fragmentation prior to index rebuild operations. In this way, DBAs can avoid the situation where an index defragmentation operation or rebuild operation is performed and then an SQL operation is executed, after the index has been defragmented, that causes the index to become fragmented. Additionally, the systems and techniques described herein may enable developers and DBAs to predict the amount of fragmentation that may occur to a new or proposed index.

The systems and techniques may be used to identify and quantify the index-fragmentation that is likely (e.g., predicted) to be caused by an SQL statement. For example, when a developer is developing a new SQL statement, the developer can determine the predicted impact on existing indexes, e.g., how much fragmentation the SQL statement is predicted to cause for each index, when the SQL statement is executed. With this information, the developer can compare the relative impact of various SQL commands, such as a DELETE operation that physically deletes the rows as compared to an UPDATE operation that flags rows as deleted without actually deleting the rows.

The systems and techniques may be used to determine an appropriate time to schedule execution of a particular SQL statement. For example, an SQL statement that causes significant index fragmentation may be scheduled to execute prior to a previously scheduled (e.g., periodic) index rebuild operation. If the system and techniques were not used, the SQL statement may end up being executed after an index rebuild operation, resulting in index fragmentation that degrades performance until a next index rebuild operation is performed.

The systems and techniques may be used to determine whether to drop indexes before an SQL statement that involves a bulk-data operation is executed and to re-create the indexes after the SQL statement has been executed. For example, if an SQL statement is predicted to result in significant (e.g., greater than a predetermined threshold) amounts of index fragmentation (e.g., due to a bulk-data operation), for more efficient operation, the indexes associated with a table may be dropped (e.g., deleted) prior to executing the SQL statement and the indexes re-created after the SQL statement has been executed. If this approach of dropping and re-creating the indexes was not used, the SQL statement (e.g., involving a bulk-data operation) may be performed more slowly, due to the overhead of index-maintenance during execution of the SQL statement, and the index may be sufficiently fragmented that a DBA may schedule an index rebuild after the SQL statement has executed.

In addition, by determining the amount of predicted fragmentation of an index when an SQL statement is executed, the DBA may selectively drop and recreate a subset of the indexes associated with a table. For example, assume a particular table includes a misspelled city name. A user may desire to execute an SQL statement to modify rows of the particular table to correct the spelling of the city name (e.g., change "New Yrok" to "New York"). Assume that five indexes are on (e.g., used to access) the particular table, and that two of the five indexes refer to a City column. Assume that the indexes on the particular table were recently rebuilt and are not currently fragmented. A DBA may either (1) execute an UPDATE SQL statement or (2) drop the two indexes that refer to the City column, execute an UPDATE statement, and rebuild the two indexes that were previously dropped. Option 1 has the advantage that during the UPDATE, the two indexes are present and can be used to perform City-related queries more quickly. Option (1) has the disadvantage that during the UPDATE, the two indexes may incur a significant amount of overhead on the performance of the UPDATE statement. As a consequence, the performance of unrelated SQL queries may suffer. Option (1) has the disadvantage that the two city-related indexes may become so fragmented after the UPDATE operation that they will need to be rebuilt and during the rebuild operation, city-related queries will be performed very slowly. Option (2) has the advantage that the UPDATE statement may be performed as quickly as possible. Option (2) has the disadvantage that city-related queries may be performed very slowly during execution of the UPDATE statement. In this example, the systems and techniques described herein enable the DBA to determine which of (1) or (2) is the better option (e.g., faster performance, greater availability, less fragmentation). If the UPDATE statement is predicted to cause more than a threshold amount of fragmentation to the two city-related indexes and the two indexes are thus likely to be rebuilt after the UPDATE statement has been executed, then the DBA may determine that option (2) is better than option (1). If the UPDATE statement is predicted to cause less than or equal to a threshold amount of fragmentation to the two city-related indexes (e.g., the two indexes may not be rebuilt after the UPDATE statement has been executed), then the DBA may determine that option (1) is better than option (2) because in Option (1) the two indexes remain 'online.'

The systems and techniques may be used when developing a new index. For example, a user (e.g., a developer or a DBA) may use the systems and techniques to determine the predicted amount of fragmentation that the new index may experience when executing existing SQL statements. This information may be used to evaluate multiple types of indexes to select a type of index that reduces I/O operations while incurring a lower amount of fragmentation relative to other types of indexes.

The data used to create a regression model may be generated as follows. An SQL server database may be created, a table in the database may be created, an index on the table may be created, and the table may be filled with data. Different SQL statements (e.g., SQL operations) may be performed on the data in the table and the 'predictor values' and the 'response variable' may be measured and recorded. The previously described technique may be automated to enumerate a large number of permutations regarding table, index, data-type, SQL-operation, fill-factor, row-count, current-AIFP, etc. For example, a cloud environment may be used to generate the permutations (in parallel) and to collect the data used to train and create the predictive regression model. In addition, data used to train and create the predictive regression model may be obtained from enterprises that use SQL server. For example, a company (e.g., Dell®) that provides hardware, software, and services to enterprises may obtain data from the enterprises (e.g., the company's customers). To illustrate, software products (e.g., Dell® Spotlight on SQL Server and SSMS plugin) may be used to monitor the variables (e.g., table, index, data-type, SQL-operation, fill-factor, row-count, current-AIFP, etc.) in customer databases and upload the data to a cloud environment for analysis and to train the regression model. While generating permutations may provide a more comprehensive set of data, using customer-based data may be useful to identify which permutations may be more common in the real-world. In some cases, a regression model may be generated using permutations and then the customer-based data may be used to 'validate' the accuracy of the regression. For example, real-world AIFP-changes in customer databases may be measured, uploaded to a cloud environment and compared with the predictions from the regression model that was created using permutations.

The rate of change of an AIFP may change as the AIFP itself changes. Therefore, when using the systems and techniques to determine the change in fragmentation of an index, the fact that the rate of change of an AIFP changes as the AIFP itself changes, may be taken into consideration. This may help avoid a situation in which the fragmentation is erroneously predicted to be greater than 100%.

The system and techniques may also be used to comply with a service-level-agreement (SLA) associated with a database. For example, the SLA may mandate that a DBA make the database available 24 hours a day, 7 days a week, except for a 'maintenance window' between 2 am-4 am each Sunday morning. Additionally, assume that the DBA is only able to perform index maintenance during this 2 hour window. For example, the index may be rebuilt during the maintenance-window and the AIFP of the index may be zero immediately after the index is rebuilt. Subsequent to the index rebuild, the AIFP may increase in an approximate linear manner during the week until on Thursday morning, the AIFP of the index exceeds a defragmentation threshold, e.g., indicating that the index is to be rebuilt. If the DBA was able to reduce the rate at which the AIFP of the index increases, so that it did not exceed the defragmentation threshold, then the DBA may be able to defragment the index during the maintenance window instead of rebuilding the index during the maintenance window. Additionally, since the AIFP of the index is reduced (at the end of the week), the database may perform more efficiently (e.g., particularly on Thursday and Friday). The DBA has the ability to modify this scenario using the "fill factor" of the index (when the index is rebuilt). If the fill-factor is increased, in some situations, then the rate at which the AIFP of the index increases may be reduced. For example, if the AIFP is increasing because the index includes a primary-key on a column that includes globally unique identifiers (GUIDs) and rows are being inserted during the week, then increasing the fill-factor may leave more "empty space" within each page of the index when it is rebuilt. The empty space enables new rows to be inserted into the index without incurring page-splits. Therefore, the AIFP of the index may change less during the week (e.g., because the index is not very 'dense' to begin with) when the index is rebuilt with a higher fill-factor. So the DBA can make a trade-off by starting each week with a 'less dense' index and ending each week with a less fragmented index. As a result, the performance of the index may be less variable over the course of the week. By increasing the fill-factor, the index may be slower at the start of the week (than the index used to be), but the index may be faster at the end of the week (than the index used to be). Thus, increasing the fill factor may result in the database being more consistent from the start of the week to the end of the week. The systems and techniques described herein may be used to detect such a scenario (e.g., where the AIFP increases rapidly over time until a defragment threshold is passed and a rebuild is scheduled) and automatically provide a suggestion to a DBA to increase the fill-factor of the index. In addition, if the systems and techniques determine that the AIFP does not increase rapidly, then the systems and techniques may automatically suggest that the fill-factor be decreased. If the AIFP increases very gradually over time, then the database may be starting the week with an index that is too 'sparse' (e.g., the DBA has over-compensated in attempting to reduce fragmentation during the week by making the fill-factor too large).

Thus, the system and techniques described herein may be used to perform one or more of (1) create an SQL statement that creates less index fragmentation as compared to other SQL statements that achieve the same (or a similar) result, (2) determine an appropriate time (e.g., prior to an index rebuild or defragmentation) to schedule an SQL statement that is predicted to cause a significant amount of index fragmentation, (3) identify SQL statements for which indexes (or a subset of the indexes) may be dropped prior to executing the SQL statements and the indexes re-created after execution, or (4) create an index for a table that incurs less fragmentation than other types of indexes.

FIG. 1 is a block diagram illustrating a computing system 100 that includes multiple databases according to some embodiments. One or more computing devices 102(1) to 102(M) (where M>0) may be communicatively coupled to one or more servers 104 via a network 106. The computing devices 102 may be used to send an SQL statement 108 to the one or more servers 104. The one or more servers 104 may receive and execute the SQL statement 108. After executing the SQL statement 108, the one or more servers 104 may return results 109.

The servers 104 may host one or more databases 130(1) to 130(N) (where N>0). Each of the databases 130 may have at least one index. For example, the database 130(N) may include an index 110. The index 110 may comprise a lookup table that a database search engine can use to speed up data retrieval (e.g., speed up providing the results 109). For example, the index 110 may be a pointer to data stored in a table 116 of the database 130(N) that includes one or more rows 118 and one or more columns 120.

Over a period of time, the servers 104 may execute multiple (e.g., hundreds or even thousands of) SQL statements, such as the SQL statement 108. Execution of the multiple SQL statements may cause the index 110 to become fragmented, creating a fragmented index 112. A DBA may perform a reorganization 114 of the fragmented index 112 to reduce the fragmentation and restore the index 110. For example the reorganization 114 may include defragmenting the fragmented index 112 (e.g., while the database 130(N) is online and processing SQL statements) or rebuilding the fragmented index 112 (e.g., while the index is offline and unavailable).

To predict index fragmentation, an SQL statement, such as the SQL statement 108, may be selected. An execution plan 122 of the SQL statement 108 may be determined. Affected indexes 124 (e.g., the indexes affected by the SQL statement 108) may be determined. The SQL statement 108, the execution plan 122, and the affected indexes 124 may be used as inputs to a predictive model 126 (e.g., a regression model) to determine a total predicted fragmentation 128 of the indexes affected by the SQL statement 108. The predictive model 126 may use a learning regression model, such as a support vector machine, linear regression, ordinary least squares regression or other regression model, to determine the total predicted fragmentation 128. The predictive model 126 may use a statistical process for predicting the relationships among variables, with a focus on the relationship between a dependent variable and one or more independent variables (or 'predictors'). The predictive model 126 may help a user understand how a dependent variable (e.g., index fragmentation) changes when an SQL statement that is executed changes. All the indexes on a table may not incur the same overhead (maintenance penalty). For example, some of the indexes on the table may be more stable (e.g., subject to less fragmentation) than other indexes on the table. For example, how prone an index is to fragmentation may be based on which particular columns have their values modified frequently and whether the particular columns appear in the index. Thus, in some cases, each of the indexes on a table may be given a different (e.g., unequal) "weight" when calculating the total predicted index fragmentation 128. For example, assume a table has three indexes I1, I2, and I3. The total predicted index fragmentation 128 may be determined as follows:

total predicted index fragmentation=(A×I1)+(B×I2)+(C×I3)

where "x" denotes multiplication and A, B, and C are weights. Thus, if all indexes are prone to a similar amount of fragmentation, then an equal weighting, e.g., A=B=C=⅓, may be used. If an index, such as I3 is more prone to fragmentation, then that index may be given a higher weight, e.g., A=B=0.25 and C=0.5, may be used.

The execution plan 122 may be analyzed to determine which tables (e.g., the table 116) are affected by the SQL statement 108 and the type of operations being performed on each of the tables. The execution plan may identify a "estimated number of rows" for each table-operation. The estimated number of rows may indicate how many rows are estimated to be affected. For each table that is estimated (e.g., by the execution plan) to experience an operation that may fragment one or more indexes (such as the index 110), the definitions of the indexes on the table may be determined, including the columns within each index definition, and metadata (e.g., fill factor) of each index. For each index, the predictive model 126 may be used to predict a change in Average Index Fragmentation Percentage (AIFP) of the index. The predicted fragmentation of each index affected by the SQL statement 108 may be summed to determine the total predicted fragmentation 128 for the SQL statement 108 (e.g., the total amount of index fragmentation of indexes affected by the SQL statement).

Determining the total predicted fragmentation 128 may include, for each row that is predicted to be modified by the SQL statement 108, predicting the change to the Average Index Fragmentation Percentage (AIFP). The AIFP may be determined using a machine learning algorithm that takes as inputs one or more of: a type of SQL statement being performed, a data-type of each column of the index, a fill factor of the index, whether the index is clustered or non-clustered, a current page-count of the index, a current AIFP of the index, other index-related information, or any combination thereof. The machine learning algorithm that is used may be based on a Support Vector Machine (SVM) or other type of machine learning model. For example, the SVM may be used to predict a change in the AIFP of the index. Based on the predicted change in AIFP, along with the estimated number of rows affected by the SQL statement, an overall change in the AIFP of the index may be determined. Summing the change in AIFP of each index affected by the SQL statement may be used to determine the total predicted fragmentation 128.

Thus, the predictive model 126 may be used to determine the total predicted fragmentation 128 associated with executing the SQL statement 108. The predictive model 126 may be used to modify (e.g., "fine-tune") the SQL statement 108 to reduce the total predicted fragmentation 128 while producing the same (or similar) results. For example, the SQL statement 108 may be modified to create a modified SQL statement, the execution plan of the modified SQL statement may be determined, and a total predicted fragmentation of the modified SQL statement may be determined. The total predicted fragmentation that the modified SQL statement is predicted to cause may be compared to the total predicted fragmentation that the original SQL statement is predicted to cause. In this example, if the modified SQL statement is predicted to cause less index fragmentation as compared to the original SQL statement, then the modified SQL statement may be selected for execution (e.g., instead of the original SQL statement).

If the SQL statement 108 is predicted to cause significant (e.g., greater than a predetermined threshold) amount of fragmentation, a new index (with a new index definition) on an affected table may be created, and a predicted change in the AIFP of the new index may be determined. If the predicted change in the AIFP associated of the new index is less than the predicted change in the AIFP associated with an existing index, the new index may be selected (e.g., instead of the existing index) for use with the affected table.

If the SQL statement 108 is predicted to cause a significant amount of index fragmentation (e.g., the total predicted fragmentation 128 satisfies an index fragmentation threshold), an appropriate time to schedule execution of the SQL statement 108 may be determined, such as prior to when the reorganization 114 (e.g., prior to an index defragmentation operation or prior to an index rebuild operation) is scheduled.

The predictive model 126 may be used to determine that one or more indexes on the SQL statement 108 may be dropped prior to executing the SQL statement 108 and the dropped indexes re-created after executing the SQL statement 108. The predictive model 126 may be used to design the index 110 for the table 116 in such a way that the index 110 incurs less fragmentation than other types of indexes. For example, if the total predicted fragmentation 128 caused by executing the SQL statement 108 satisfies a predetermined threshold, one or more of the affected indexes 124 may be dropped before executing the SQL statement 108, the SQL statement 108 may be executed, and the one or more indexes that were dropped may be re-created (e.g., after execution of the SQL statement 108).

Figure 2:
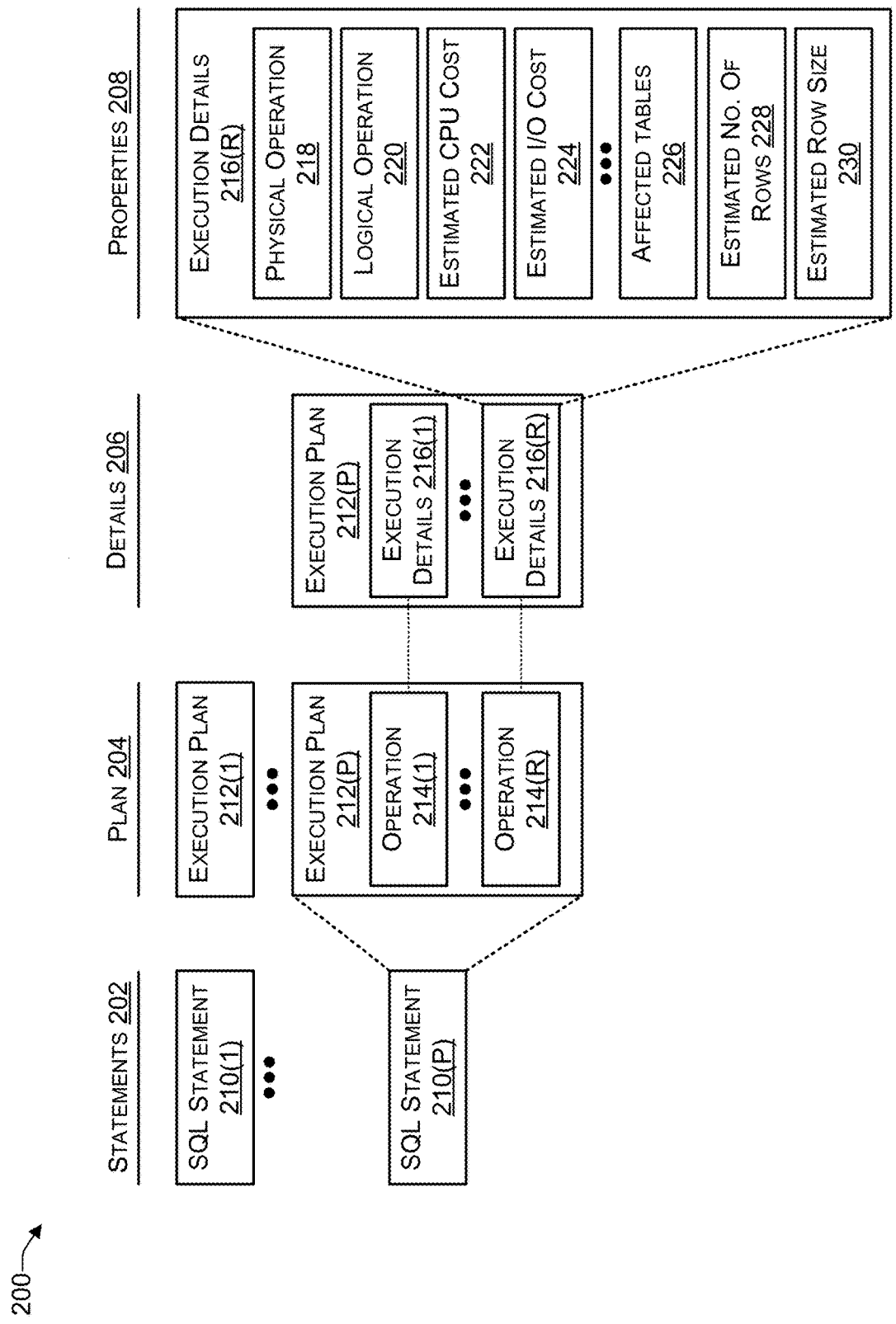
FIG. 2 is a block diagram illustrating a user interface to display properties of an execution plan according to some embodiments.

FIG. 2 is a block diagram illustrating a user interface 200 to display properties of an execution plan according to some embodiments. The user interface 200 may have multiple columns, such as, for example, a statements 202 column, a plan 204 column, a details 206 column, and a properties 208 column. Each row of the statements 202 column may include a particular SQL statement. For example, the statements 202 column may include SQL statements 210(1) to 210(P) (P>0).

Each of the SQL statements 210 may have a corresponding execution plan, e.g., the SQL statement 210(1) may have a corresponding execution plan 212(1) and the SQL statement 210(P) may have a corresponding execution plan 212(P). Each of the execution plans 212 may display the operations performed (e.g., executed) for the corresponding SQL statement. For example, when the SQL statement 210(P) is selected, the execution plan 212(P), including operations 214(1) to 214(R) (R>0, R not necessarily equal to P), may be displayed by the user interface 200. Thus, executing the SQL statement 210(P) may result in the operations 214(1) to 214(P) being performed.

For each of the operations 214, the user interface 200 may display a corresponding set of execution details. For example, the operation 214(1) may have a corresponding set of execution details 216(1) and the operation 214(R) may have a corresponding set of execution details 216(R). Selecting one of the execution details 216 may cause the user interface 200 to display information about the selected execution details. For example, selecting the execution details 216(R) may display details associated with the operation 214(R), such as, for example, a physical operation 218 being performed (by the operation 214(R)), a logical operation 220 being performed, an estimated central processing unit cost 222, an estimated input/output (I/O) cost 224, affected tables 226, an estimated number of rows 228 affected, an estimated row size 230, other execution details, or any combination thereof.

The physical operation 218 may identify physical operations being performed by the operation 214(R), such as a JOIN operation, a SEEK operation, a SCAN operation or the like. The logical operation 220 may identify logical operations being performed by the operation 214(R), such as an ALL operation, an AND operation, an ANY operation, or the like. The estimated CPU cost 222 may provide a score to enable a user to determine whether the corresponding operation (e.g., the operation 214(R)) is CPU intensive. The estimated CPU cost 222 may be used for comparison purposes, e.g., a first estimated CPU cost of a first operation may be compared to a second estimated CPU cost of a second operation to determine whether the first operation is more CPU intensive as compared to the second operation. For example, a large estimated CPU cost 222 value may indicate a relatively high amount of CPU consumption while a small estimated CPU cost 222 value may indicate a relatively small amount of CPU consumption.

The estimated I/O cost 224 may provide a score to enable a user to determine whether the corresponding operation (e.g., the operation 214(R)) is I/O intensive. The estimated I/O cost 224 may be used for comparison purposes, e.g., a first estimated I/O cost of a first operation may be compared to a second estimated I/O cost of a second operation to determine whether the first operation is more I/O intensive as compared to the second operation. For example, a large estimated I/O cost 224 value may indicate a relatively high amount of I/O consumption while a small estimated I/O cost 224 value may indicate a relatively small amount of I/O consumption. The affected tables 226 may identify the tables that are estimated to be affected by the corresponding operation (e.g., the operation 214(R)). The estimated number of rows 228 may identify a total size of a row affected by the corresponding operation (e.g., the operation 214(R)).

Thus, the execution details 216 associated with the execution plans 212 may be displayed by the user interface 200. At least some of the execution details 216, such as the estimated number of rows 228 and the estimated row size 230, may be used when determining the total predicted fragmentation 128 of FIG. 1.

Figure 3:
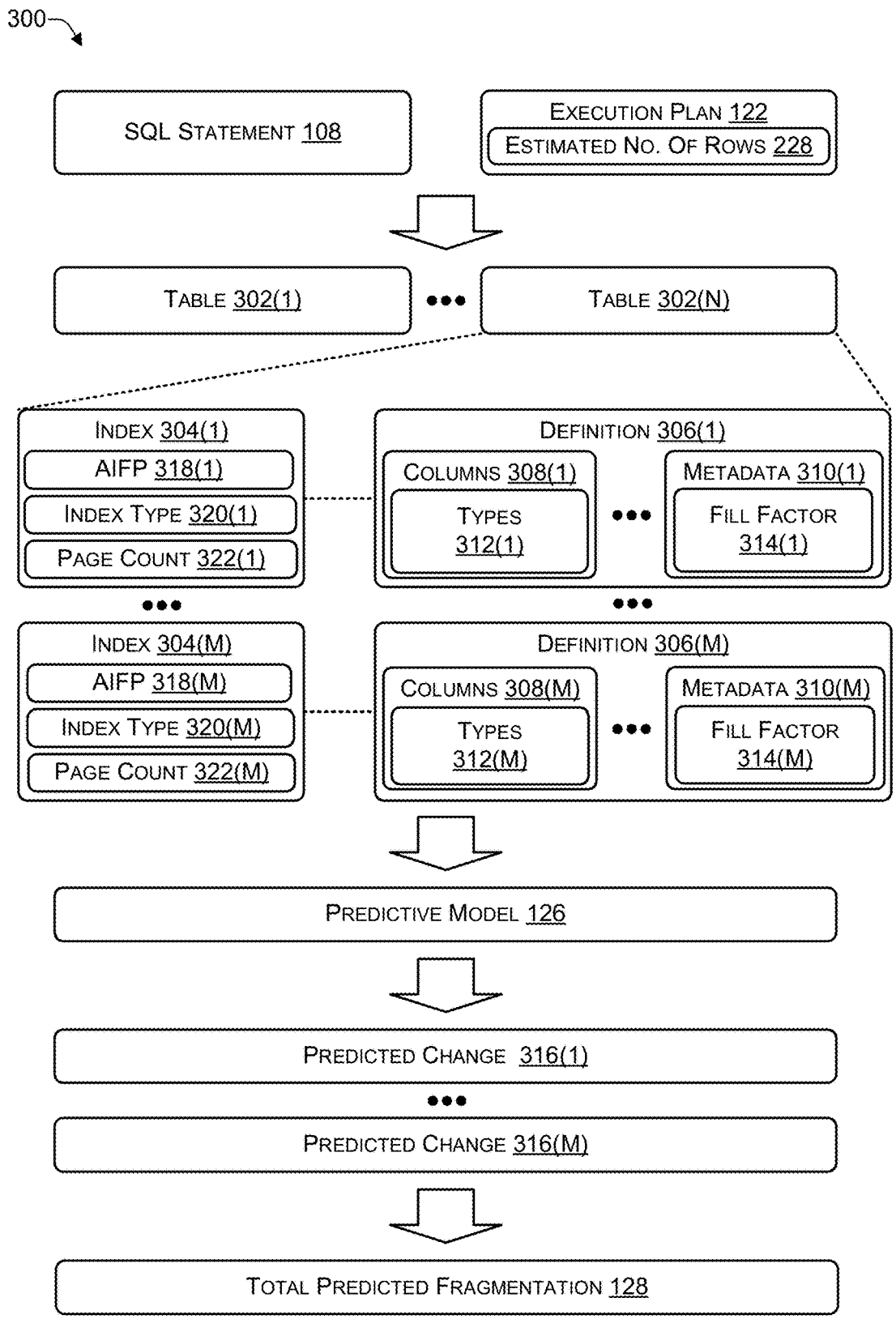
FIG. 3 is a block diagram illustrating a computing system to predict index fragmentation for multiple indexes according to some embodiments.

FIG. 3 is a block diagram illustrating a computing system 300 to predict index fragmentation for multiple indexes according to some embodiments. The computing system 300 may predict the change to the Average Index Fragmentation Percentage (AIFP) of each index, for each row of a table that is modified by an SQL statement.

To determine the total predicted fragmentation 128, a SQL statement, such as the SQL statement 108, may be selected. The execution plan 122 of the SQL statement 108 may be determined. The indexes affected by the SQL statement 108 may be determined. The predictive model 126 may be used to determine the total predicted fragmentation 128 of the indexes affected by the SQL statement 108. The predictive model 126 may use machine learning, such as a support vector machine or other technique, to determine the total predicted fragmentation 128.

The execution plan 122 may be analyzed to determine tables 302(1) to 302(N) that are affected by the SQL statement 108 and the type of operations being performed on each of the tables 302. The execution plan 122 may determine the estimated number of rows 228 for each table affected. For each of the tables 302 that is estimated (e.g., by the execution plan 122) to experience an operation that may fragment indexes 304(1) to 304(M), definitions 306(1) to 306(M) of the indexes 304(1) to 304(M), respectively, on the table 302(N) may be determined, including columns 308(1) to 308(M) within each of the definitions 306(1) to 306(M), and metadata 310, including a fill factor 314, of each of the indexes 304. The definitions 306 may include types of data stored in each of the columns 308.

For each of the indexes 304, the predictive model 126 may be used to determine a predicted change 316 in AIFP of the index. For example, the predictive model 126 may determine the predicted change 316(1) in AIFP associated with the index 304(1) and the predictive model 126 may determine the predicted change 316(M) in AIFP for the index 304(M). The predicted change 316 in AIFP of each of the indexes 304 affected by the SQL statement 108 may be summed to determine the total predicted fragmentation 128 for the SQL statement 108 (e.g., the total amount of index fragmentation of indexes affected by the SQL statement).

For each row of each table that is predicted to be modified by the SQL statement 108, the predicted change 316 of the AIFP of the indexes 304 may be determined using the predictive model 126, e.g., a machine learning algorithm that takes as inputs one or more of: a type of the SQL statement 108, the data types 312 of each column of each of the affected indexes 304, the fill factors 314, whether the indexes 304 are clustered or non-clustered, a current page-count of each of the indexes 304, a current AIFP 318 of each of the indexes 304, other index-related information, or any combination thereof. The machine learning algorithm that the predictive model 126 uses may be based on a Support Vector Machine (SVM) or other type of machine learning algorithm. For example, the SVM may be used to predict a change in the AIFP 318 of each of the indexes 304. Based on the predicted change in the AIFP 318, along with the estimated number of rows affected by the SQL statement 108, the predicted change 316 in the AIFP of each of the indexes 304 may be determined. Summing the change in AIFP of each index affected by the SQL statement may be used to determine the total predicted fragmentation 128.

Thus, the SQL statement 108 may be selected and the execution plan 122 may be determined. The execution plan 122 may be analyzed to determine the tables 302(1) to 302(N) affected by the SQL statement 108 and the type of operations being performed on each of the tables 302. Based on the execution plan 122, the estimated number of rows 228 affected by the SQL statement 108 may be determined, for each of the tables 302(1) to 302(N). For each of the tables 302(1) to 302(N) that is predicted to be affected by an operation in the execution plan 122 that could fragment one or more indexes (e.g., the indexes 304 of the table 302), the definitions 306 of the indexes 304 on the tables 302 may be determined, e.g., including the columns 308 in the index definitions 306, and the metadata 310 for the indexes 304 (e.g., the fill factor 314 etc.). The predictive model 126 may be used to determine the predicted change 316 in the AIFP of each of the indexes 304. The predicted change 316 of the indexes 304 affected by the SQL statement 108 may be summed to determine the total predicted fragmentation 128 for the SQL statement 108.

The predictive model 126 may determine the predicted change 316 in AIFP for each of the indexes 304, for each row of the tables 302 that is being modified by the SQL statement 108. For example, the predictive model 126 may take into consideration the type of SQL operation (e.g., the physical operation 218 or the logical operation 220) being performed, the data-types 312 of each of the columns 308 in each of the indexes 304, the fill factor 314 of each of the indexes 304, an index type 320 (e.g. clustered or non-clustered), a current page count 322, a current AIFP 318, another characteristic of each of the indexes 304, or any combination thereof.

Thus, the predictive model 126 may be used to determine the total predicted fragmentation 128 associated with execution of the SQL statement 108. The predictive model 126 may be used to create the SQL statement 108 in such a way as to reduce the total predicted fragmentation 128. For example, a developer may create the SQL statement 108 and the user interface 200 may display one or more options (e.g., suggestions) to reduce fragmentation, e.g., "consider using an UPDATE instead of a DELETE operation to reduce fragmentation of the index." As another example, a developer may create several SQL statements that each achieve the same result, predict the amount of fragmentation for each SQL statement, and then select the SQL statement that is predicted to cause the least fragmentation as compared to the other SQL statements.

If the SQL statement 108 is predicted to cause a significant amount of index fragmentation (e.g., the total predicted fragmentation 128 satisfies an index fragmentation threshold), a DBA (or an automated scheduler) may determine an appropriate time to schedule execution of the SQL statement 108, such as prior to a previously scheduled index defragmentation operation or index rebuild operation. For example, several SQL statements may be scheduled for execution. An automated scheduler may determine the amount of index fragmentation predicted for each SQL statement and re-schedule those SQL statements that are predicted to have a significant (e.g., greater than a predetermined threshold) amount of index fragmentation close together and prior to an index defragmentation operation or an index rebuild operation.

The predictive model 126 may be used to determine that one or more of the indexes 304 on the SQL statement 108 may be dropped prior to executing the SQL statement 108 and the dropped indexes re-created after executing the SQL statement 108. The predictive model 126 may be used to design at least one of the indexes 304(1) to 304(M) on the table 302(N) to reduce the amount of fragmentation that the index incurs over a particular period of time as compared to other types of indexes.

Figure 4:
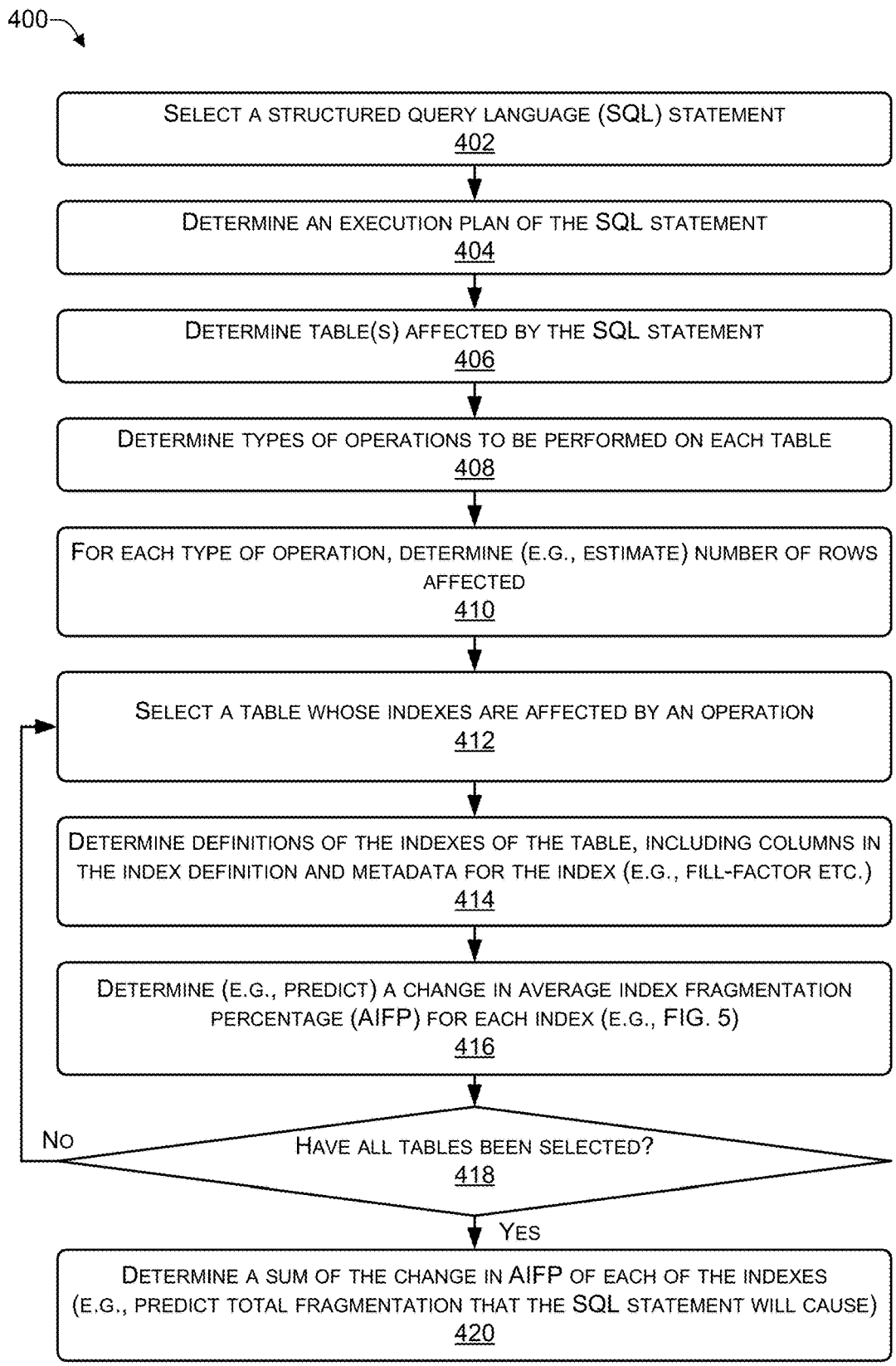
FIG. 4 is a flowchart of a process that includes predicting a total index fragmentation caused by an SQL statement according to some embodiments.
Figure 5:
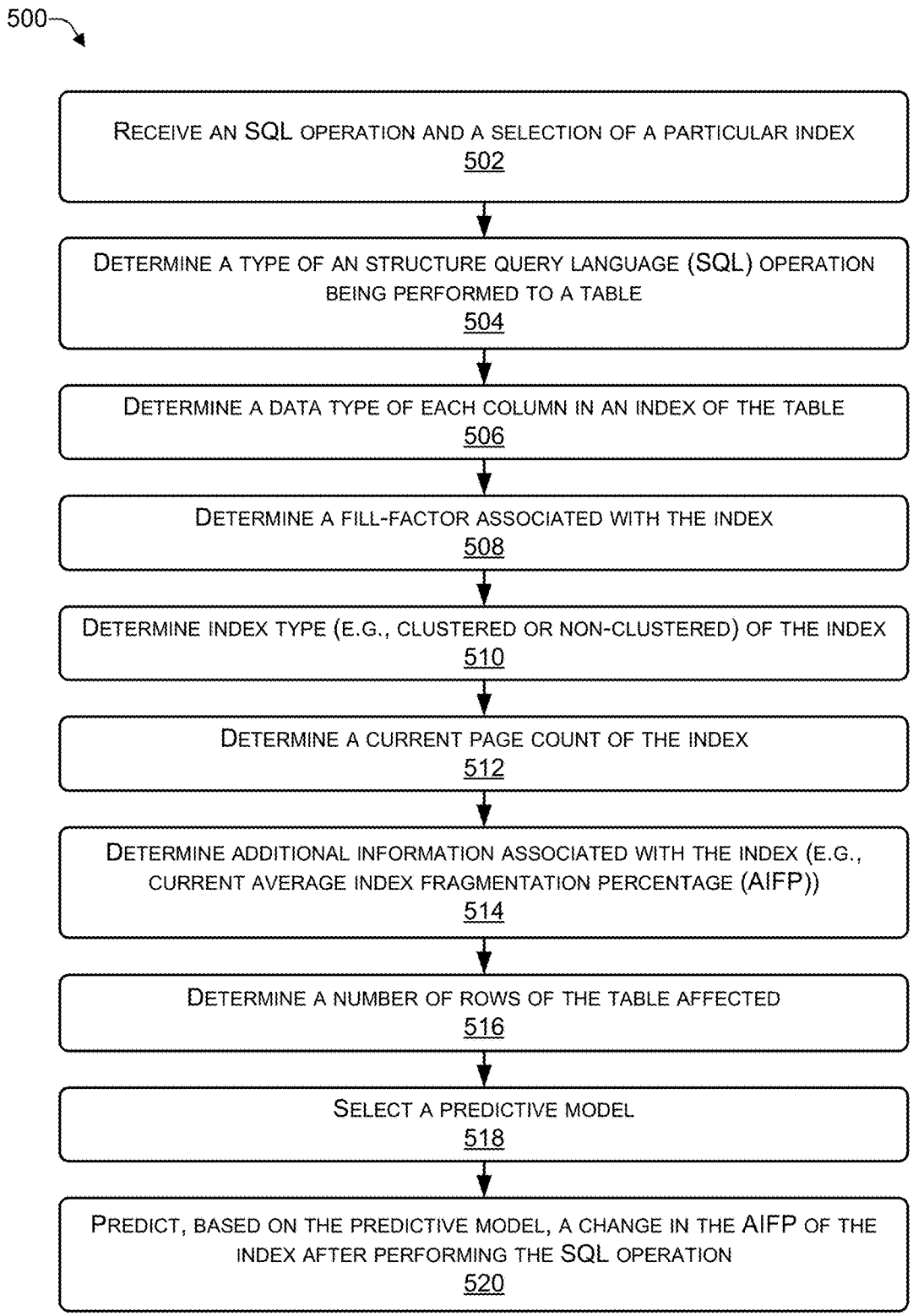
FIG. 5 is a flowchart of a process that includes determining an average index fragmentation percentage (AIFP) according to some embodiments.

In the flow diagrams of FIGS. 4 and 5 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400 and 500 are described with reference to FIG. 1, 2, or 3 as described above, although other models, frameworks, systems and environments may implement these processes.

FIG. 4 is a flowchart of a process 400 that includes predicting a total index fragmentation caused by an SQL statement according to some embodiments. For example, the process 400 may be performed by one or more components executing on the server 104 of FIG. 1.

At 402, an SQL statement may be selected. At 404, an execution plan of the SQL statement may be determined. At 406, one or more tables affected by the SQL statement may be determined. For example, in FIG. 3, to determine the total predict fragmentation 128, the SQL statement 108 may be selected. The execution plan 122 of the SQL statement 108 may be determined. The tables 302(1) to 302(N) affected by the SQL statement 108 may be determined.

At 408, types of operations being performed on each table may be determined. At 410, for each type of operation being performed, an estimated number of rows that are affected may be determined. For example, in FIG. 2, the estimated number of rows that are affected by the SQL statement 210(P) may be determined from the execution details 216(R).

At 412, a table whose indexes are affected by an operation (e.g., according to the execution plan) may be selected. At 414, definitions of the indexes of the table may be determined, including columns in the index definition and metadata (e.g., fill factor, etc.). At 416, for each index of the (selected) table that is affected by an operation, a change in AIFP is determined (e.g., as described in FIG. 5). For example, in FIG. 3, the table 302(N) may be affected by one or more operations of the SQL statement 108. The definitions 306 associated with the table 302(N) may be determined, including the columns 308 and the metadata 310. For each of the indexes 304, the predicted change 316 in AIFP may be determined. For example, the predicted change 316(1) may be determined for the index 304(1) and the predicted change 316(M) may be determined for the index 304(M).

At 418, determination is made whether all affected tables have been selected. If a determination is made, at 418, that "no", all tables have not been selected, then a next table whose indexes are affected may be selected, at 412. If a determination is made, at 418, that "yes", all affected tables have been selected, then the process proceeds to 420, where the change in the AIFP of each of the indexes may be summed. For example, the process may perform 412 through 416 for each of the tables 302(1) to 302(N) that are estimated to be affected by the SQL statement 108. After the predicted change 316(1) to 316(M) in AIFP has been determined for each of the indexes 304(1) to 304(M), respectively, that are affected by the SQL statement 108, the predicted changes 316(1) to 316(M) in AIFP may be summed to determine the total predicted fragmentation 128, which represents the total amount of fragmentation (e.g., change to the indexes) caused by the SQL statement.

Thus, a total predicted fragmentation associated with execution of an SQL statement may be determined. For example, a developer may create an SQL statement to reduce the total predicted fragmentation. As another example, if an SQL statement is predicted to cause a significant amount of index fragmentation, a DBA may determine an appropriate time to schedule execution of the SQL statement, such as within a predetermined period (e.g., X hours) prior to a previously scheduled index defragmentation operation or index rebuild operation. The total predicted fragmentation may be used to determine that one or more indexes on an SQL statement may be dropped prior to executing the SQL statement and the dropped indexes re-created after executing the SQL statement, thereby reducing the amount of time used to access the table and increasing the time that the table is accessible. The total predicted fragmentation may be used to design at least one index on a table to reduce the amount of fragmentation that the index incurs (e.g., over a particular period of time) as compared to other types of indexes.

FIG. 5 is a flowchart of a process 500 that includes determining an average index fragmentation percentage (AIFP) according to some embodiments. For example, the process 500 may be performed by one or more components executing on the server 104 of FIG. 1.

At 502, the process may receive an SQL operation and a particular index. The process 500 may predict the fragmentation that execution of the SQL statement is likely to cause to the index. At 504, a type of the SQL operation being performed to a table may be determined. For example, in FIG. 2, the execution plan 212(P) associated with the SQL statement 210(P) may identify the operations 214(1) to 214(R) that are being performed. The type of each of the operations 214 being performed may be specified in the execution details. For example, the execution details 216(R) may specify the type of the operation 214(R), such the physical operation 218 being performed, the logical operation 220 being performed, etc.

At 506, a data type of each column in an index of the table may be determined. At 508, a fill factor associated with the index may be determined. At 510, an index type (e.g., clustered or non-clustered) of the index may be determined. At 512, a current page count of the index may be determined. At 514, additional information (e.g., a current AIFP) associated with the index may be determined. For example, in FIG. 3, the data types 312 of each of the columns 308 in each index 304 of the table 302 may be determined. The fill factor 314 associated with each index 304 may be determined. The index type 320 (e.g., clustered or non-clustered) of each index 304 may be determined. The current page count 322 of each index 304 may be determined. Additional information, such as the current AIFP 318 associated with each index 304, may be determined.

At 516, a number of rows of the table affected (e.g., by the SQL operation) may be determined. At 518, a predictive model (e.g., based on a SVM or other machine learning algorithm) may be selected. At 520, based on the predictive model, a change in the AIFP of the index after performing the SQL statement may be predicted. For example, in FIG. 2, the estimated number of rows 228 of the table affected by the SQL operation 214(R) may be determined. As another example, in FIG. 3, the predictive model 126 (e.g., based on a SVM or other machine learning algorithm) may be selected. Based on the predictive model 126, the predicted changes 316 in the AIFP of one of the indexes 304, after performing the SQL statement 108, may be predicted.

Thus, a predicted change in AIFP of a particular index affected by an SQL statement may be determined. This process may be repeated for each index on the table. The predicted changes in AIFP to each index may be summed to determine a total predicted fragmentation caused by execution of the SQL statement. Thus, the total predicted fragmentation associated with execution of the SQL statement may be used by users in many different ways. For example, a developer may create an SQL statement to reduce the total predicted fragmentation. If the SQL statement is predicted to cause a significant amount of index fragmentation, a DBA may determine an appropriate time to schedule execution of the SQL statement, such as within a predetermined period (e.g., X hours) prior to a previously scheduled index defragmentation operation or index rebuild operation. The total predicted fragmentation may be used by a developer or a DBA to determine that one or more indexes on an SQL statement may be dropped prior to executing the SQL statement and the dropped indexes re-created after executing the SQL statement. The total predicted fragmentation may be used by a developer to design at least one index on a table to reduce the amount of fragmentation that the index incurs (e.g., over a particular period of time) as compared to other types of indexes.

FIG. 6 illustrates an example configuration of a computing device that can be used to implement the systems and techniques described herein, such as to implement the central server 104 of FIG. 1. The computing device 600 may include at least one processor 602, a memory 604, communication interfaces 606, a display device 608, other input/output (I/O) devices 610, and one or more mass storage devices 612, configured to communicate with each other, such as via a system bus 614 or other suitable connection.

The processor 602 is a hardware device that may include a single processing unit or a number of processing units, all of which may include single or multiple computing units or multiple cores. The processor 602 can be implemented as one or more microprocessors, microcomputers, microcontrollers, digital signal processors, central processing units, state machines, logic circuitries, and/or any devices that manipulate signals based on operational instructions. Among other capabilities, the processor 602 can be configured to fetch and execute computer-readable instructions stored in the memory 604, mass storage devices 612, or other computer-readable media.

Memory 604 and mass storage devices 612 are examples of computer storage media (e.g., memory storage devices) for storing instructions which are executed by the processor 602 to perform the various functions described above. For example, memory 604 may generally include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein, and may be a media capable of storing computer-readable, processor-executable program instructions as computer program code that can be executed by the processor 602 as a particular machine configured for carrying out the operations and functions described in the implementations herein.

The computing device 600 may also include one or more communication interfaces 606 for communicating with other devices via the network 106. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 606 can also provide communication with external storage (not shown), such as in a storage array, network attached storage, storage area network, or the like. A display device 608, such as a monitor may be included in some implementations for displaying information and images to users. Other I/O devices 610 may be devices that receive various inputs from a user and provide various outputs to the user, and may include a keyboard, a remote controller, a mouse, a printer, audio input/output devices, and so forth.

The computer storage media, such as memory 604 and mass storage devices 612, may be used to store software and data. For example, the computer storage media may be used to store applications and data, such as the SQL statement 108, the execution plan 122, the affected indexes 124, the predictive model 126, the total predicted fragmentation 128, other applications 616 and other data 618.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Software modules include one or more of applications, bytecode, computer programs, executable files, computer-executable instructions, program modules, software code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various embodiments of the method and apparatus of the present invention have been illustrated herein in the Drawings and described in the Detailed Description, it will be understood that the invention is not limited to the embodiments disclosed, but is capable of numerous rearrangements, modifications and substitutions without departing from the scope of the present disclosure.

What is claimed is:

1. A computer-implemented method, comprising:
    determining an execution plan associated with a structured query language (SQL) statement;
    identifying, based on the execution plan, a first table estimated to be affected by the SQL statement;
    determining a first index definition of a first index on the first table, wherein the first index includes a lookup table of the first table;

17 applying a first weighted value to the first index based on determining a stability of the first index, where the stability of the first index is based on whether the first index is subject to less fragmentation than another index on the first table;

determining, based on a predictive model, a first predicted change in an average index fragmentation percentage associated with the first index;

identifying a second table predicted to be affected by the SQL statement;

determining a second index definition of a second index on the second table;

applying a second weighted value to the second index based on determining the stability of the second index, where the stability of the second index is based on whether the second index is subject to less fragmentation than another index on the second table;

determining, based on the predictive model, a second predicted change in the average index fragmentation percentage associated with the second index;

determining a total predicted fragmentation based at least in part on the first weighted value, the second weight value, the first predicted change in the average index fragmentation percentage associated with the first index and the second predicted change in the average index fragmentation percentage associated with the second index; and performing, based on the total predicted fragmentation, at least one remedial action to reduce fragmentation, the at least one remedial action being (a) creating a remedial SQL statement that creates less index fragmentation compared to other SQL statements that achieve similar results, (b) scheduling performance of a remedial SQL statement prior to an index rebuild or defragmentation that is predicted to less fragmentation, (c) identifying a remedial SQL statement for which an index may be dropped prior to executing the SQL statement and the index recreated after execution, (d) creating an index for a table that incurs less fragmentation than an alternative type of index, or (e) a combination thereof.

2. The computer-implemented method of claim 1, wherein the predictive model is based at least in part on a support vector machine.

3. The computer-implemented method of claim 1, wherein determining, based on the predictive model, the first predicted change in the average index fragmentation percentage associated with the first index comprises determining at least one of:
a type of a SQL operation identified in the execution plan;
a data-type of each column included in the first index;
a fill factor of the first index;
an index type of the first index, the index type including one of a clustered type or a non-clustered type;
a page-count of the first index; or
a current average index fragmentation percentage associated with the first index.

4. The computer-implemented method of claim 1, further comprising:
determining, based on the execution plan, a first set of operations to be performed on the first table;
for individual operations in the first set of operations, determining a first estimated number of rows affected in the first table, based on the execution plan;
determining, based on the execution plan, a second set of operations to be performed on the second table; and

18 for each operation in the second set of operations, determining a second estimated number of rows affected in the second table, based on the execution plan.

5. The computer-implemented method of claim 4, further comprising:
determining, based on the predictive model, the total predicted fragmentation based at least in part on:
the first predicted change in the average index fragmentation percentage associated with the first index;
the first estimated number of rows affected in the first table;
the second predicted change in the average index fragmentation percentage associated with the second index; and
the second estimated number of rows affected in the second table.

6. The computer-implemented method of claim 1, further comprising:
determining that the total predicted fragmentation satisfies a predetermined threshold; and
scheduling execution of the SQL statement prior to defragmenting at least one of the first index or the second index.

7. The computer-implemented method of claim 1, further comprising:
determining that the total predicted fragmentation satisfies a predetermined threshold; and
scheduling execution of the SQL statement prior to rebuilding at least one of the first index or the second index.

8. One or more non-transitory computer-readable media storing instructions that are executable by one or more processors to perform operations comprising:
determining an execution plan associated with a structured query language (SQL) statement;
identifying, based on the execution plan, a first table estimated to be affected by the SQL statement;
determining a first index definition of a first index on the first table, wherein the first index includes a lookup table of the first table;
applying a first weighted value to the first index based on determining a stability of the first index, where the stability of the first index is based on whether the first index is subject to less fragmentation than another index on the first table;
determining, based on a predictive model, a first predicted change in an average index fragmentation percentage associated with the first index;
identifying a second table predicted to be affected by the SQL statement;
determining a second index definition of a second index on the second table;
applying a second weighted value to the second index based on determining the stability of the second index, where the stability of the second index is based on whether the second index is subject to less fragmentation than another index on the second table;
determining, based on the predictive model, a second predicted change in the average index fragmentation percentage associated with the second index;
determining a total predicted fragmentation based at least in part on the first weighted value, the second weight value, the first predicted change in the average index fragmentation percentage associated with the first index and the second predicted change in the average index fragmentation percentage associated with the second index; and performing, based on the total predicted fragmentation, at least one remedial action to reduce fragmentation, the at least one remedial action being (a) creating a remedial SQL statement that creates less index fragmentation compared to other SQL statements that achieve similar results, (b) scheduling performance of a remedial SQL statement prior to an index rebuild or defragmentation that is predicted to less fragmentation, (c) identifying a remedial SQL statement for which an index may be dropped prior to executing the SQL statement and the index recreated after execution, (d) creating an index for a table that incurs less fragmentation than an alternative type of index, or (e) a combination thereof.

9. The one or more non-transitory computer-readable media of claim 8, the operations further comprising:
modifying the SQL statement to create a modified statement;
determining a modified execution plan associated with the modified statement;
determining a modified total predicted fragmentation associated with the modified statement; determining that the modified total predicted fragmentation associated with the modified statement is less than the total predicted fragmentation associated with the SQL statement; and
executing the modified statement instead of the SQL statement.

10. The one or more non-transitory computer-readable media of claim 8, the operations further comprising:
determining that the total predicted fragmentation satisfies a predetermined threshold;
dropping at least the first index;
executing the SQL statement; and
recreating at least the first index.

11. The one or more non-transitory computer-readable media of claim 8, the operations further comprising:
determining a third index definition of a third index on the first table;
determining, based on the predictive model, a third predicted change in the average index fragmentation percentage associated with the third index;
determining that the third predicted change in the average index fragmentation percentage associated with the first index is less than the first predicted change in the average index fragmentation percentage associated with the first index; and
selecting the third index for use with the first table.

12. The one or more non-transitory computer-readable media of claim 11, the operations further comprising:
preventing the first index from being used with the first table.

13. The one or more non-transitory computer-readable media of claim 8, wherein the first index on the first table comprises at least one of:
a current average index fragmentation percentage associated with the first index;
an index type indicating whether the first index is a clustered index or a non-clustered index; or
a page count associated with the first index.

14. A server, comprising:
one or more processors; and
one or more non-transitory computer-readable media storing instructions that are executable by the one or more processors to perform operations comprising:
determining an execution plan associated with a structured query language (SQL) statement;
identifying, based on the execution plan, a first table estimated to be affected by the SQL statement;
determining a first index definition of a first index on the first table, wherein the first index includes a lookup table of the first table;
applying a first weighted value to the first index based on determining a stability of the first index, where the stability of the first index is based on whether the first index is subject to less fragmentation than another index on the first table;
determining, based on a predictive model, a first predicted change in an average index fragmentation percentage associated with the first index;
identifying a second table predicted to be affected by the SQL statement;
determining a second index definition of a second index on the second table;
applying a second weighted value to the second index based on determining the stability of the second index, where the stability of the second index is based on whether the second index is subject to less fragmentation than another index on the second table;
determining, based on the predictive model, a second predicted change in the average index fragmentation percentage associated with the second index;
determining a total predicted fragmentation based at least in part on the first weighted value, the second weight value, the first predicted change in the average index fragmentation percentage associated with the first index and the second predicted change in the average index fragmentation percentage associated with the second index; and
performing, based on the total predicted fragmentation, at least one remedial action to reduce fragmentation, the at least one remedial action being (a) creating a remedial SQL statement that creates less index fragmentation compared to other SQL statements that achieve similar results, (b) scheduling performance of a remedial SQL statement prior to an index rebuild or defragmentation that is predicted to less fragmentation, (c) identifying a remedial SQL statement for which an index may be dropped prior to executing the SQL statement and the index recreated after execution, (d) creating an index for a table that incurs less fragmentation than an alternative type of index, or (e) a combination thereof.

15. The server of claim 14, the operations further comprising:
determining, based on the execution plan, a first set of operations to be performed on the first table;
for individual operations in the first set of operations, determining a first estimated number of rows affected in the first table, based on the execution plan;
determining, based on the execution plan, a second set of operations to be performed on the second table; and
for individual operations in the second set of operations, determining a second estimated number of rows affected in the second table, based on the execution plan.

16. The server of claim 15, the operations further comprising:
determining, based on the predictive model, the total predicted fragmentation based at least in part on:
the first predicted change in the average index fragmentation percentage associated with the first index;
the first estimated number of rows affected in the first table;

the second predicted change in the average index fragmentation percentage associated with the second index; and the second estimated number of rows affected in the second table.

17. The server of claim 14, the operations further comprising:

determining that the total predicted fragmentation satisfies a predetermined threshold; and scheduling execution of the SQL statement prior to defragmenting at least one of the first index or the second index.

18. The server of claim 14, the operations further comprising:

determining that the total predicted fragmentation satisfies a predetermined threshold; and scheduling execution of the SQL statement prior to rebuilding at least one of the first index or the second index.

19. The server of claim 14, the operations further comprising:

determining that the total predicted fragmentation satisfies a predetermined threshold;

dropping at least the first index;

executing the SQL statement; and recreating at least the first index.

20. The server of claim 14, the operations further comprising:

determining that the total predicted fragmentation satisfies a predetermined threshold;

dropping at least the first index;

executing the SQL statement; and recreating at least the first index after executing the SQL statement.

* * * * *